Figure 1:
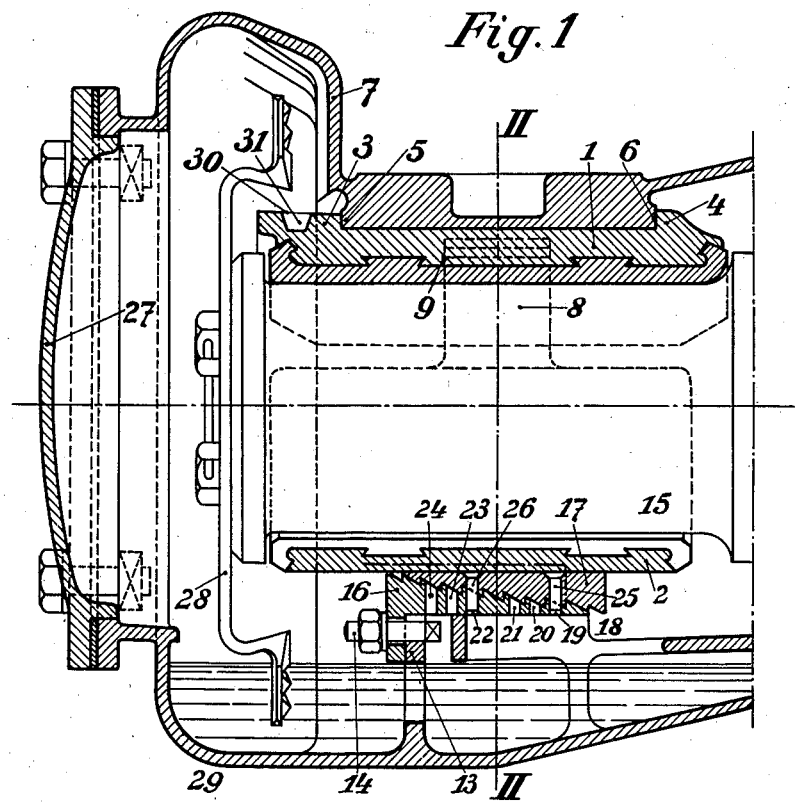

Nov. 17, 1936.   V. A. BARY   2,060,793

LUBRICATED AXLE BEARING

Filed March 26, 1930

Inventor

Victor Alexander Bary

Patented Nov. 17, 1936

2,060,793

UNITED STATES PATENT OFFICE 2,060,793

LUBRICATED AXLE BEARING

Victor Alexander Bary, London, England

Application March 26, 1930, Serial No. 439,106
In Great Britain April 8, 1929

18 Claims. (Cl. 308—83)

The axle bearings with top lubrication hitherto known convey the lubricant by means of passages through the journal brass to the space between the axle journal and the journal brass. The openings of these passages are always in the running surface of the journal brass, whether the principle of force feed lubrication or the principle of drip feed lubrication be employed. In the former case the running surface of the journal brass is provided with longitudinal grooves, with or without transverse grooves, in which the lubricant collects and is carried thence by the movement of the axle journal to form the oil key. With this kind of lubrication a film of lubricant of moderate thickness is, it is known, obtained. In the case of drip lubrication, in the arrangements hitherto known the passages in the journal brass also lead into the running surface of the journal brass so that drip points are formed in the lining of the bearing from which the lubricant drips on to the axle journal. If there is sufficient space between the journal brass and the axle journal a correspondingly thick film of lubricant is formed also in this case.

These known processes and arrangements have however the disadvantage that the running surface of the axle brass is broken by the grooves, recesses and hollow spaces of all kinds with the result that the production of a coherent film of oil is disturbed. Further the manufacture of journal brasses formed in this manner is accompanied by considerable difficulties both as regards casting and machining. In order that space may be allowed for the arrangement of the extended system of grooves, the breadth of the axle brass must be considerable. The axle brass therefore requires considerable amounts of metal to be used, a circumstance which is all the more disadvantageous because the axle brasses are usually made of valuable and costly metals.

The present invention overcomes these drawbacks of the known arrangements. The invention is based on the recognition that drip lubrication feed of the axle journal from an edge outside the running surface of the journal brass enables, on the one hand, the lubricating film to be developed to form a smooth mirror undisturbed by any grooves and recesses and on the other hand, the journal brass to be simply formed and considerably reduced in size. Another advantage of the foregoing is the fact that whenever in consequence of outside disturbances, caused for instance by some foreign bodies penetrating between the running surface and axle journal, the metal lining will melt and run out, the liquid metal cannot block the bore holes previously arranged inside the journal box, preventing thus the interruption of the flow of the lubricant and allowing continuation of the run without the metal lining but in perfect safety until, as this is the case for instance with railway vehicles, the next railroad station equipped for repair work, that is for the exchange of the journal box, has been reached. Finally the side flanges of the journal brass, which in previous arrangements were arranged laterally of the drip points, are omitted. The lubricant itself is conducted to the drip point by means of a conveying device which is known per se and is suitably driven by the rotary movement of the axle journal. The drip point itself is preferably formed by a fixed part of the axle bearing, more particularly by the journal brass itself. One or more of the boundary surfaces adjacent to the inner surface of the journal brass serves to conduct the lubricant to the drip point, in which case these lubricant-conducting boundary surfaces of the journal brass are inclined in an upward direction when looked at from the drip point. The lubricant can be conducted to these boundary surfaces or directly to the drip point, by transferring it by means of a conveying device for example by a centrifugal disc, from the sump of the axle bearing to the upper side of the journal brass and from here by way of recesses, channels or slots in or on the journal brass, in or on the casing, in or on both, or through separate conduits until it reaches the drip point.

Owing to the arrangement of the drip-edges on the outside of the running surface, a very narrow upper brass results so that when subjected to horizontal shocks, the axle journal can easily leave the journal brass. Another object of the present invention is the elimination of this danger; the problem being solved by the arrangement of a lower lubricating brass and the upward extension of the lower brass above the centre of the journal towards the drip point. If the lower brass be provided with lateral fitting surfaces the transverse forces which occur can be transmitted directly to the axle-box, without stresses, other than compressive stresses, on the parts which transmit the forces occurring the parts of the bearing are suitable for receiving the forces as compressive forces owing to the purpose for which they are naturally designed. The specific stresses are thus reduced and the life of the bearing increased. If the lateral fitting surfaces are parallel the lower brass can be fixed at different heights to suit different diameters of journal without interfering with the transmission of transverse forces. The lower brass is secured against displacement in the axle-box, in particular in the vertical direction, by means of a distance or fitting piece. The distance piece itself is preferably fitted by sliding it between the lower brass and the axle-box and is connected fast to the latter in its end position for example by means of a flange, a rib on the axle-box and a square-headed bolt.

The required adjustment of the lower lubricating brass is suitably effected by the alteration of the thickness of a fitting piece by which the axle-brass is supported on the axle-box. That is to say a necessary part of the axle-bearing which must itself be present is employed for effecting the adjustability by altering its thickness. Thus special parts, such as insertion pieces or the like, which are required only for the purposes of adjustment are entirely eliminated, and there is the further advantage that, even when subjected to shocks, no alteration in the part receiving them occurs so that the necessary fineness in the degree of adjustability is ensured. Preferably the alteration in the thickness of the fitting piece is effected by making it of two parts which are in connection along slanting divisional surfaces, and can be fixed relatively one to the other in various positions. In particular the inclined partition surfaces may be provided with projections, teeth, steps, undulations, indentations or the like, by which the relative position of the parts of the fitting pieces is fixed in the position of support without other means. In order to adjust the axle-brass it is only necessary to remove the fitting piece from the bearing and to displace the parts which are in connection along the slanting partition surface through one or more undulations, teeth, indentations or the like and then to reinsert the fitting piece. In order however that on the one hand the position of the parts of the fitting piece remain the same even when taken out and on the other hand the parts of the fitting piece may be prevented from being unintentionally displaced relatively to one another when the fitting piece is in position, the separate parts of the fitting piece are provided with holes arranged transversely to the inclined partition surfaces in which bolts, for securing the parts in a fixed relative position, can be received. Preferably the holes are arranged in at least one of the parts of the fitting piece at such distance one from another that the play between the axle-brass and journal which can occur before the next alteration in the thickness of the fitting piece does not exceed a definite maximum amount.

Figure 2:
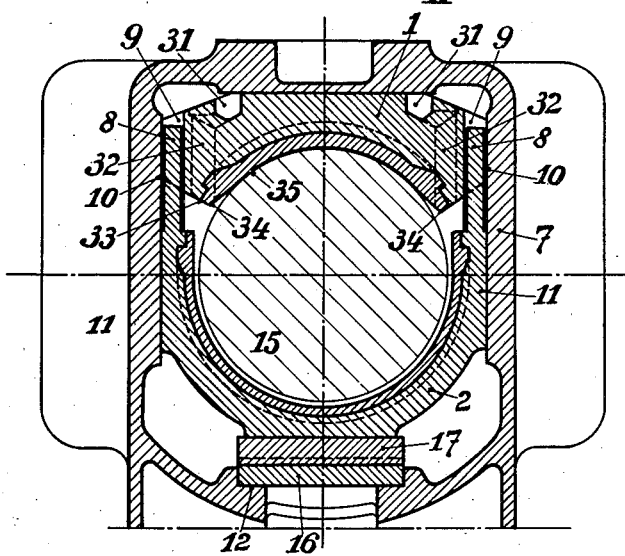

A constructional embodiment of the invention is illustrated by way of example in the accompanying drawing, in which Fig. 1 is a longitudinal section through an axle bearing in accordance with the invention, Fig. 2 is a section on the line II—II of Fig. 1.

In all figures 15 represents the axle journal, 1 the upper journal brass, 7 the axle box and 27 the bearing cover. The centrifugal disc 28, which conveys the lubricant from the sump 29 to the upper side 30, of the axle brass 1, is rigidly connected in known manner to the axle journal 15. As may be seen from Fig. 1, the said upper side of the axle brass 1 has a recess 31 in which the conveyed oil collects and by which it is conducted into the passages 32. The passages 32 conduct the lubricant to boundary surfaces 33 which are situated on the lower side of the journal brass 1 and, when seen from the drip lubricating edge, are upwardly inclined. The lubricant thus falls naturally out of the passages 32 along the lubricant-conducting boundary surfaces 33 to the drip edges 34, which, in accordance with the invention, are arranged outside the running surface 35 of the journal brass 1; the lubricant is released from the drip edges 34 in the form of streams or a thread and reaches the axle journal 15. It is carried round by the rotary movement of the latter and forms the lubricating film. As Fig. 2 shows, owing to the omission in accordance with the invention of all breaks on the running surface 35 of the journal brass 1 it is possible to obtain an unbroken, mirror-like, smooth film of lubricant and at the same time to obtain a simple and relatively narrow journal brass which is characterized by the relatively small amount of material required for its manufacture and by a simplification of the casting and machining processes.

In a further development of the invention, there is provided below the axle journal 15 a lower lubricating brass 2 which simultaneously effects in suitable manner a second lubrication of the axle journal 15. According to the invention, the lower axle brass 2 is extended towards the drip point beyond the centre of the journal and is provided with lateral fitting surfaces 11 which abut against the side walls of the axle box, so that all transverse forces are transmitted to the axle box 7, all parts which take part in the transmission of these forces being subjected to compressive stress. The fitting surfaces 11 are parallel so that the lower brass 2 can be adjusted at different heights to suit different journal diameters without interfering with the transmission of transverse forces.

The lower brass needs to be adjustable with respect to the journal 15 because the diameter of the latter decreases in use through wear and subsequent machining (turning and polishing). Whereas the upper brass 1 always automatically rests on the journal 15, the lower brass needs to be adjusted in order to maintain the air space between it and the journal 15 at such a size that on the one hand a sufficiently good film of lubricant can be formed and on the other hand the space left between the journal and axle-brass across which shocks can be given is not great.

In accordance with the invention and in order to secure this necessary adjustment, a fitting piece consisting of two parts 16 and 17 connected along inclined partition surfaces is slid into the axle-box at 12 and is secured against displacement on the one hand by ribs 13 on the axle-box and on the other hand by bolts 14, and secures the lower brass 2 vertically against any shifting. The inclined partition surface is provided with indentations 18. Whereas in Fig. 1 the full lines show the position of the parts 16 and 17 corresponding to the least thickness of the fitting piece, the dotted lines show a position which the fitting piece assumes on displacing the two parts relatively by one indentation. Thus the thickness of the fitting piece increases by an amount depending on the inclination of the partition surface and the distance displaced so that the axle-brass can be adjusted by this amount after the fitting piece has been removed and its separate parts have been displaced in the manner just described. The separate parts 16 and 17 of the fitting piece are also provided with holes 19, 20, 21 and 22, 23, 24 respectively arranged transversely to the partition surface the distance apart of which is so chosen that the possible play between the axle-brass and journal before the next alteration in the thickness of the fitting piece does not exceed a pre-determined maximum value. The relative position in which the parts 16 and 17 have been set can be maintained by means of the bolts 25 and 26. The maximum alteration in the thickness of the fitting piece corresponds to the largest amount by which it is allowable for the diameter of the journal to be reduced. By means of the inclination of the partition surfaces and by arranging a suitable number of indentations 18 it becomes possible to make a sufficiently fine adjustment in the thickness of the fitting piece and therefore a sufficiently fine adjustment of the axle-brass.

The upper brass is secured against displacement in the axle direction by means of the segmental stops 3 and 4, which abut against corresponding projections 5 and 6 of the axle-box 7. The lower brass is secured against displacement in the axial direction by its side flaps or projections 8 which engage in corresponding recesses 9 in the upper brass 1.

In particular, the lower brass can be lowered after the distance piece has been taken out, so that the upper axle-brass can be taken out forwardly free from the lower brass and over the collar of the journal. The bearing can also be taken to pieces with the upper and lower brasses remaining on the journal; in this case the axle-box is lifted off over the stop on the brass. The upper and lower brasses can then be removed. The axle-brasses or the axle-box can of course be assembled in a similar manner.

Conversely it is also within the scope of the invention to secure the lower brass 2 against displacement in the axial direction by means of a stop on the upper brass which engages in a corresponding recess in the lower brass 2.

I claim:

1. In a journal bearing particularly for railway vehicles, the combination comprising an axle journal, an upper bearing brass transmitting the load to the journal and having an unbroken, smooth bearing surface, the lateral portions of the bearing surface of the brass being clear of the journal, the end surfaces of the brass being upwardly inclined and intersecting said lateral portions above the journal, whereby drip surfaces are formed which lie lower than the adjacent surfaces of the brass, and means for conveying lubricant to said dripping surfaces.

2. In a journal bearing, particularly for railway vehicles, the combination comprising an upper journal brass having an unbroken, smooth cylindrical surface, the lateral portions of the bearing surface of the brass being clear of the journal, said brass having upwardly inclined surfaces in other planes intersecting said lateral portions of the brass above the journal, said lateral surface portions running upwardly from the line of intersection, whereby drip surfaces are formed which lie lower than the adjacent surfaces of the brass, and means arranged to conduct lubricant to said drip surface.

3. In a journal bearing particularly for railway vehicles, the combination comprising an upper journal brass having an unbroken, smooth cylindrical bearing surface, the lateral portions of the bearing surface of the brass being clear of the journal, said brass having upwardly inclined surfaces in other planes intersecting said lateral portions of the brass above the journal, said lateral surface portions running upwardly from the line of intersection whereby drip surfaces are formed which lie lower than the adjacent surfaces of the brass, said drip surfaces including the bottom line of intersection of the inclined surfaces with said lateral portions, said bottom line being parallel to the journal axis and defining a drip edge, and means for conducting lubricant to at least one of the inclined surfaces for guiding the lubricant to said drip edge.

4. In a journal bearing, particularly for railway vehicles, the combination comprising an upper journal brass having an unbroken, smooth cylindrical surface, the lateral portions of the bearing surface of the brass being clear of the journal, said brass having upwardly inclined surfaces in other planes intersecting said lateral portions of the brass above the journal, said lateral surface portions running upwardly from the line of intersection, whereby drip surfaces are formed which lie lower than the adjacent surfaces of the brass, conduits outside the area of contact between the journal and brass adapted to conduct the lubricant to the drip surface, and means for conducting lubricant to said conduits.

5. In a journal bearing, particularly for railway vehicles, the combination of an upper journal brass having for the greater part a radius substantially equal to that of the journal with which it is used, the lateral portions of the bearing surface of the brass being clear of the journal, so that wedge-shaped entry spaces for oil are formed between the journal and brass, said brass having upwardly inclined surfaces in planes other than those of said lateral portions of the brass intersecting said lateral portions above the journal and along a bottom line defining a drip edge, whereby the lubricant flowing along the side of the brass from the crown of the brass is distributed by said drip edge along the length of the journal, the inner surface of said brass being smooth and unbroken and substantially cylindrical in character so that the lubricant is rolled out in said spaces into a substantially unbroken lubricating film.

6. In an axle bearing, particularly for railway vehicles, the combination comprising a journal box, an axle journal, an upper journal brass situated on said journal, the lateral portions of the bearing surface of the brass being clear of the journal, said brass having upwardly inclined surfaces intersecting said lateral portions above the journal, said lateral surface portions running upwardly from the line of intersection, whereby drip surfaces are formed which lie lower than the adjacent surfaces of the brass, a lower lubricating brass below the axle journal and supporting the latter and adapted to maintain a film of lubricant between itself and the journal, said lower brass being separate from and adjustable with respect to the upper brass and extending towards the drip surface beyond the center of the axle journal, and being closely fitted against the walls of the journal box to transfer transverse forces directly to the journal box, and a fitting piece between the lower brass and the box for holding the brass rigidly in adjusted position.

7. In an axle bearing, particularly for railway vehicles, the combination comprising a journal box, an axle journal, an upper journal brass situated on said journal, the lateral portions of the bearing surface of the brass being clear of the journal, said brass having upwardly inclined surfaces intersecting said lateral portions above the journal, said lateral surface portions running upwardly from the line of intersection, whereby drip surfaces are formed which lie lower than the adjacent surfaces of the brass, a lower lubricating brass below the axle journal supporting the latter and adapted to maintain a film of lubricant between itself and such journal, said lower brass being separate from and adjustable with respect to the upper brass and extending towards the drip surface beyond the center of the axle journal, said lower brass having parallel lateral surfaces fitting closely against the walls of the journal box to transfer transverse forces from the lower brass directly to the journal box, and a fitting piece between the lower brass and the box for holding the brass rigidly in adjusted position.

8. In a journal bearing, particularly for railway vehicles, the combination comprising a journal box, an upper journal brass having an unbroken, smooth cylindrical surface, the lateral portions of the bearing surface of the brass being clear of the journal, said brass having upwardly inclined surfaces intersecting said lateral portions above the journal, said lateral surface portions running upwardly from the line of intersection, whereby drip surfaces are formed which lie lower than the adjacent surfaces of the brass, and a lower lubricating brass below the axle journal supporting the latter and fitted closely within the journal box, so as to bear firmly against the latter and secure the axle journal against horizontal shocks, said lower brass being separate from and adjustable with respect to the upper brass and constructed and arranged to maintain a lubricating film between itself and the journal.

9. A journal bearing as set forth in claim 8, wherein the lower brass extends toward the drip surface above the center of the axle journal.

10. In a journal bearing, particularly for railway vehicles, the combination comprising a journal box, an upper journal brass having an unbroken, smooth cylindrical surface, the lateral portions of the bearing surface of the brass being clear of the journal, said brass having upwardly inclined surfaces intersecting said lateral portions above the journal, said lateral surface portions running upwardly from the line of intersection, whereby drip surfaces are formed which lie lower than the adjacent surfaces of the brass, a lower lubricating brass below the axle journal supporting the latter and constructed and arranged to maintain a lubricating film between itself and the journal, said lower brass being separate from and adjustable with respect to the upper brass, and a rigid fitting piece adapted to secure the brasses against radial displacement in the journal box and cause the lower brass to bear firmly against the axle box to thereby protect the journal against shocks.

11. A journal bearing as set forth in claim 9, wherein the fitting piece is slidably received between one of the journal brasses and the journal box and including means for fixing said fitting piece in its adjusted position to the journal box.

12. A journal bearing as set forth in claim 8, including means for adjusting the lower brass relatively to the upper brass towards the axle journal.

13. In an axle bearing, particularly for railway vehicles, the combination comprising an axle journal, an upper journal brass situated on said journal, the lateral portions of the bearing surface of the brass being clear of the journal, said brass having upwardly inclined surfaces in other planes intersecting said lateral portions of the brass above the journal, said lateral surface portions running upwardly from the line of intersection, whereby drip surfaces are formed which lie lower than the adjacent surfaces of the brass, a lower lubricating brass below the axle journal, said lower brass extending towards the drip surface beyond the centre of the axle journal, flanges in one of the brasses, and recesses in the other of the brasses cooperating to secure the brasses against longitudinal displacement.

14. In an axle bearing, particularly for railway vehicles, the combination comprising an axle, journal, an upper journal brass siuated on said journal and transmitting the load to the journal, the lateral portions of the bearing surface of the brass being clear of the journal, said brass having upwardly inclined surfaces in other planes intersecting said lateral portions of the brass above the journal, said lateral surface portions running upwardly from the line of intersection, whereby drip surfaces are formed which lie lower than the adjacent surfaces of the brass, a lower lubricating brass, which is not under load, arranged below the axle journal, a fitting piece, and means adapted to alter the thickness of said fitting piece.

15. In an axle bearing, particularly for railway vehicles, the combination comprising an axle, journal, an upper journal brass situated on said journal and transmitting the load to the journal, the lateral portions of the bearing surface of the brass being clear of the journal, said brass having upwardly inclined surfaces in other planes intersecting said lateral portions of the brass above the journal, said lateral surface portions running upwardly from the line of intersection, whereby drip surfaces are formed which lie lower than the adjacent surfaces of the brass, a lower lubricating brass, which is not under load, arranged below the axle journal, a fitting piece, said fitting piece consisting of a plurality of parts, the surfaces of two parts being inclined towards the surface supporting said fitting piece against the journal brass, and means adapted to fix the position of the parts of the fitting piece towards each other.

16. In an axle bearing, particularly for railway vehicles, the combination comprising an axle journal, an upper journal brass situated on said journal, the lateral portions of the bearing surface of the brass being clear of the journal, said brass having upwardly inclined surfaces in other planes intersecting said lateral portions of the brass above the journal, said lateral surface portions running upwardly from the line of intersection, whreby drip surfaces are formed which lie lower than the adjacent surfaces of the brass, a lower lubricating brass below the axle journal, and a fitting piece to secure the brasses against radial displacement in the journal box, said fitting piece consisting of a plurality of parts, the surfaces of two parts being inclined towards the surface supporting said fitting piece against the journal brass, said inclined surfaces provided with interlocking teeth.

17. In an axle bearing, particularly for railway vehicles, the combination comprising an axle journal, an upper journal brass situated on said journal, the lateral portions of the bearing surface of the brass being clear of the journal, said brass having upwardly inclined surfaces in other planes intersecting said lateral portions of the brass above the journal, said lateral surface portions running upwardly from the line of intersection, whereby drip surfaces are formed which lie lower than the adjacent surfaces of the brass, a lower lubricating brass below the axle journal, a fitting piece consisting of a plurality of parts, the surfaces of two parts being inclined towards the surface supporting said fitting piece against the journal brass, the parts of said fitting piece provided with bore holes transversely arranged with regard to the inclined surface, and rigid bolts received in said holes.

18. In an axle bearing, particularly for railway vehicles, the combination comprising an axle journal, an upper journal brass situated on said journal, the lateral portions of the bearing surface of the brass being clear of the journal, said brass having upwardly inclined surfaces in other planes intersecting said lateral portions of the brass above the journal, said lateral surface portions running upwardly from the line of intersection, whereby drip surfaces are formed which lie lower than the adjacent surfaces of the brass, a lower lubricating brass below the axle journal, a fitting piece to secure the brasses against radial displacement in the journal box, said fitting piece consisting of a plurality of parts, the surfaces of two parts being inclined towards the surface supporting said fitting piece against the journal brass, and provided with teeth, the parts of said fitting piece having bore holes arranged transversely with regard to the inclined surface, and rigid bolts received in said holes.

VICTOR ALEXANDER BARY.